US012618804B2

(12) United States Patent
Arabul et al.

(10) Patent No.: US 12,618,804 B2
(45) Date of Patent: May 5, 2026

(54) METHODS AND APPARATUS FOR ACOUSTIC METROLOGY

(71) Applicant: ASML Netherlands B.V., Veldhoven (NL)

(72) Inventors: Mustafa Ümit Arabul, Eindhoven (NL); Zili Zhou, Veldhoven (NL); Willem Marie Julia Marcel Coene, Veldhoven (NL); Coen Adrianus Verschuren, Eindhoven (NL); Paul Louis Maria Joseph Van Neer, Bergschenhoek (NL); Daniele Piras, Amsterdam (NL); Sandra Blaak, Zwijndrecht (NL); Wouter Dick Koek, Zoetermeer (NL); Robert Wilhelm Willekers, Veldhoven (NL)

(73) Assignee: ASML Netherlands B.V., Veldhoven (NL)

( * ) Notice: Subject to any disclaimer, the term of this patent is extended or adjusted under 35 U.S.C. 154(b) by 288 days.

(21) Appl. No.: 18/268,467

(22) PCT Filed: Dec. 15, 2021

(86) PCT No.: PCT/EP2021/085869
§ 371 (c)(1),
(2) Date: Jun. 20, 2023

(87) PCT Pub. No.: WO2022/136047
PCT Pub. Date: Jun. 30, 2022

(65) Prior Publication Data
US 2024/0085379 A1 Mar. 14, 2024

(30) Foreign Application Priority Data
Dec. 22, 2020 (EP) .................................... 20216378

(51) Int. Cl.
*G01N 29/04* (2006.01)
*G01N 29/26* (2006.01)
*G01N 29/28* (2006.01)

(52) U.S. Cl.
CPC ........... *G01N 29/04* (2013.01); *G01N 29/262* (2013.01); *G01N 29/28* (2013.01); *G01N 2291/023* (2013.01); *G01N 2291/106* (2013.01)

(58) Field of Classification Search
CPC ...... G01N 29/04; G01N 29/262; G01N 29/28; G01N 2291/023; G01N 2291/106;
(Continued)

(56) References Cited

U.S. PATENT DOCUMENTS 10,845,304 B2    11/2020    Pisarenco et al.
11,536,654 B2    12/2022    Pisarenco et al.
(Continued)

FOREIGN PATENT DOCUMENTS

EP       3 474 074 A1    4/2019
TW       2019-32986 A    8/2019

OTHER PUBLICATIONS

International Search Report and Written Opinion of the International Searching Authority directed to International Patent Application No. PCT/EP2021/085869, mailed Mar. 17, 2022; 9 pages.
(Continued)

*Primary Examiner* — Xin Y Zhong
(74) *Attorney, Agent, or Firm* — FINNEGAN, HENDERSON, FARABOW, GARRETT & DUNNER, LLP

(57) ABSTRACT

A metrology apparatus for determining one or more parameters of a structure fabricated in or on a semiconductor substrate. The apparatus comprises a transducer array comprising a plurality of transducers positioned in a plane. The
(Continued)

plurality of transducers comprises at least one transmitter transducer for emitting acoustic radiation in a frequency range from 1 GHz to 100 GHz towards the structure, and at least one receiver transducer for receiving acoustic radiation reflected and/or diffracted from the structure.

19 Claims, 6 Drawing Sheets

(58) Field of Classification Search
    CPC ......... G01N 2291/2697; G01N 29/223; G01N 29/2468; G01N 29/343; G01N 29/348; G01N 29/043
    See application file for complete search history.

(56) References Cited

U.S. PATENT DOCUMENTS

| | | | | |
|---|---|---|---|---|
| 2017/0030864 A1* | 2/2017 | Georgeson | ............ | G01N 29/07 |
| 2019/0113452 A1* | 4/2019 | Pisarenco | ........... | G03F 7/70341 |
| 2019/0305208 A1* | 10/2019 | Ohashi | ................ | H10N 30/302 |

OTHER PUBLICATIONS

International Preliminary Report on Patentability directed to International Patent Application No. PCT/EP2021/085869, issued Jun. 13, 2023; 7 pages.

\* cited by examiner

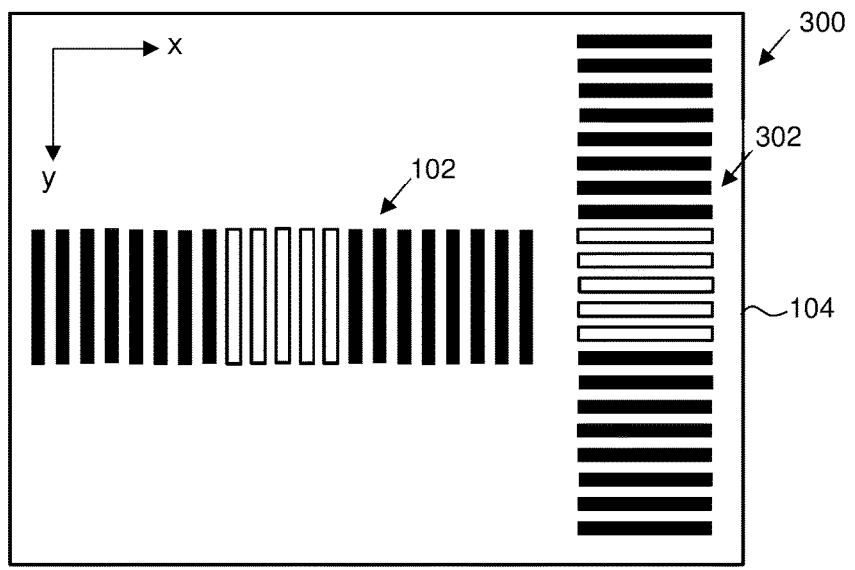
Figure 3
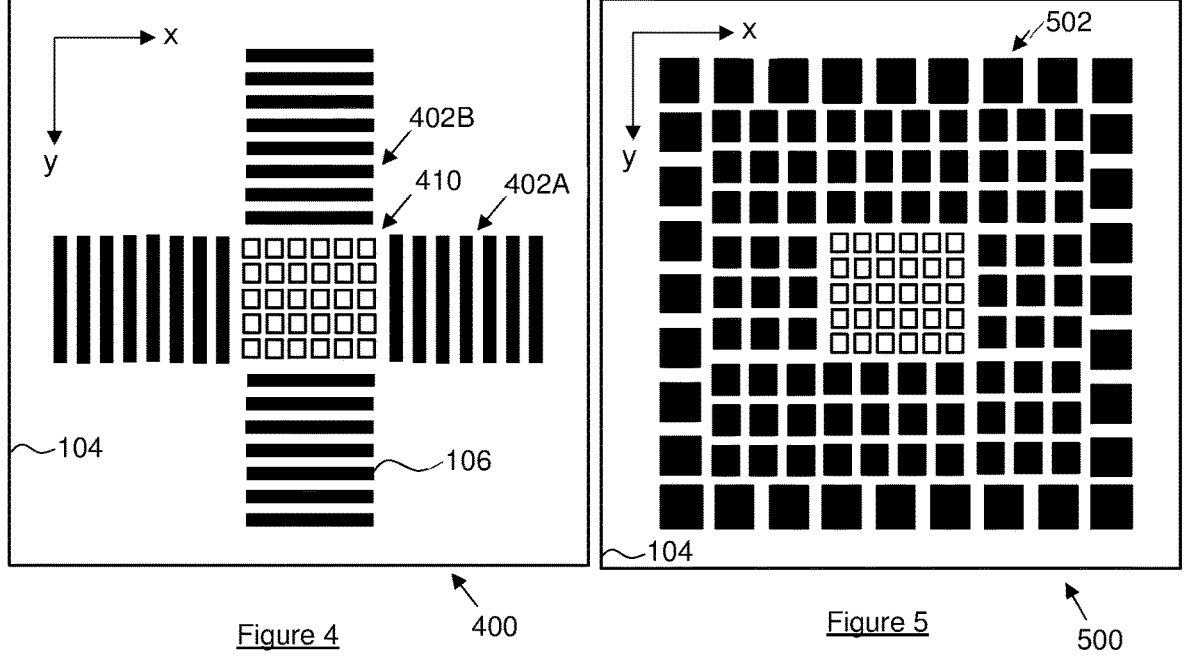
Figure 4
Figure 5

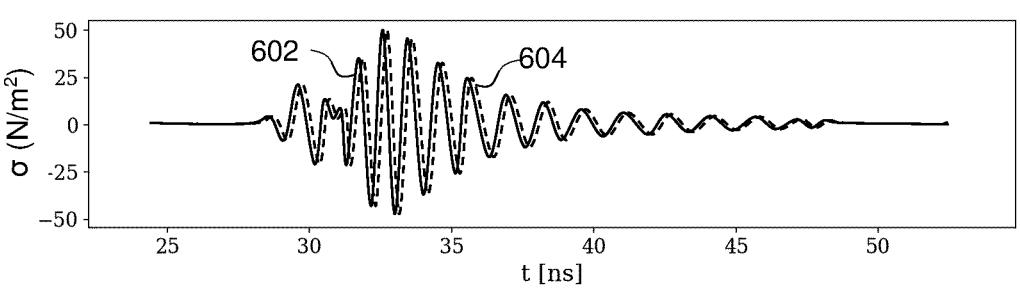
Figure 6
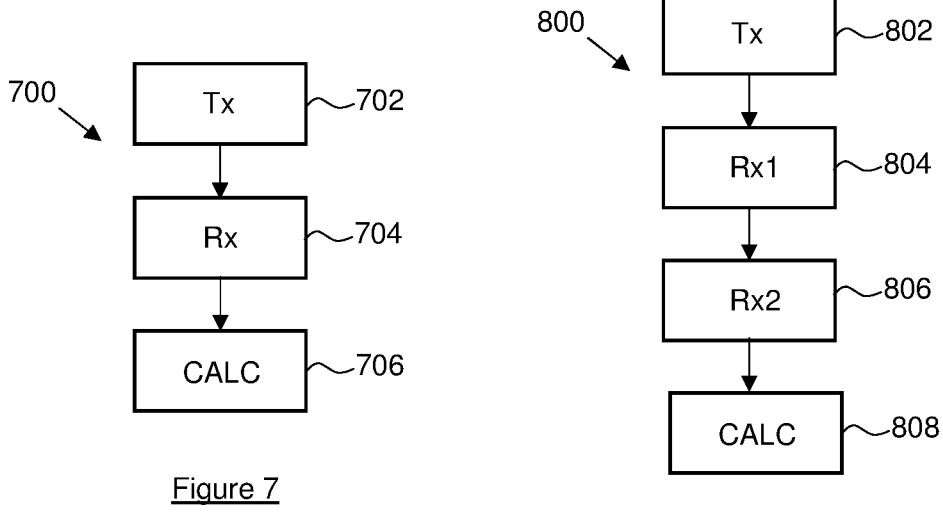
Figure 7
Figure 8
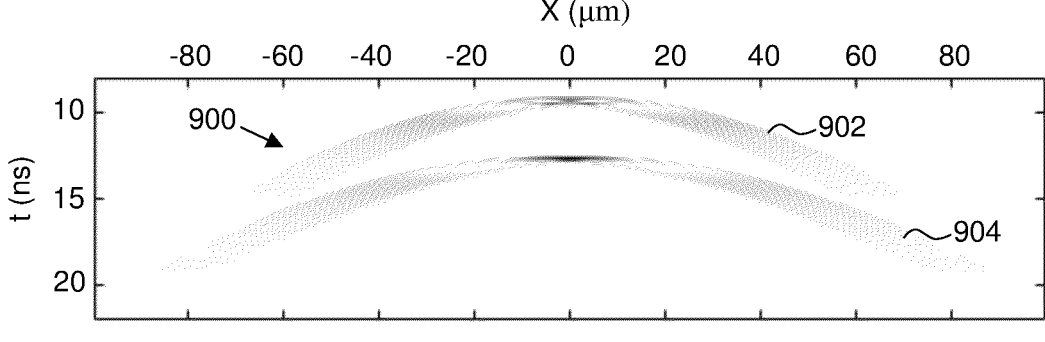
Figure 9

1506

1508

1510

1502

1504

1500

1600

SIM — 1602

ADJ — 1604

FAB — 1606

METHODS AND APPARATUS FOR ACOUSTIC METROLOGY

CROSS-REFERENCE TO RELATED APPLICATIONS

This application claims priority of EP application 20216378.8 which was filed on Dec. 22, 2020 and which is incorporated herein in its entirety by reference.

FIELD

The present disclosure relates to metrology apparatus and methods usable, for example, in the manufacture of devices by lithographic techniques

BACKGROUND

A lithographic apparatus is a machine constructed to apply a desired pattern onto a substrate. A lithographic apparatus can be used, for example, in the manufacture of integrated circuits (ICs). A lithographic apparatus may, for example, project a pattern (also often referred to as "design layout" or "design") at a patterning device (e.g., a mask) onto a layer of radiation-sensitive material (resist) provided on a substrate (e.g., a wafer). The projected pattern may form part of a process to fabricate a structure onto the substrate.

To project a pattern on a substrate a lithographic apparatus may use electromagnetic radiation. The wavelength of this radiation determines the minimum size of features which can be formed on the substrate. Typical wavelengths currently in use are 365 nm (i-line), 248 nm, 193 nm and 13.5 nm. A lithographic apparatus, which uses extreme ultraviolet (EUV) radiation, having a wavelength within the range 4-20 nm, for example 6.7 nm or 13.5 nm, may be used to form smaller features on a substrate than a lithographic apparatus which uses, for example, radiation with a wavelength of 193 nm.

Low-$k_1$ lithography may be used to process features with dimensions smaller than the classical resolution limit of a lithographic apparatus. In such process, the resolution formula may be expressed as $CD=k_1 \times \lambda/NA$, where $\lambda$ is the wavelength of radiation employed, NA is the numerical aperture of the projection optics in the lithographic apparatus, CD is the "critical dimension" (generally the smallest feature size printed, but in this case half-pitch) and $k_1$ is an empirical resolution factor. In general, the smaller $k_1$ the more difficult it becomes to reproduce the pattern on the substrate that resembles the shape and dimensions planned by a circuit designer in order to achieve particular electrical functionality and performance. To overcome these difficulties, sophisticated fine-tuning steps may be applied to the lithographic projection apparatus and/or design layout. These include, for example, but not limited to, optimization of NA, customized illumination schemes, use of phase shifting patterning devices, various optimization of the design layout such as optical proximity correction (OPC, sometimes also referred to as "optical and process correction") in the design layout, or other methods generally defined as "resolution enhancement techniques" (RET). Alternatively, tight control loops for controlling a stability of the lithographic apparatus may be used to improve reproduction of the pattern at low k1.

In lithographic processes, it is desirable to make frequent measurements of the structures created, e.g., for process control and verification. Various tools for making such measurements are known, including scanning electron microscopes, which are often used to measure critical dimension (CD), and specialized tools to measure overlay, the accuracy of alignment of two layers in a device. Markers such as gratings may be provided in or on the layers to assist with measuring one or more properties of the structure. Recently, various forms of scatterometers have been developed for use in the lithographic field.

There are limitations in the performance of optical scatterometers. For example, for con-trolling the manufacture of semiconductor devices such as 3D XPoint non-volatile memory and 3D NAND, it is difficult or impossible to measure overlay through opaque mask layers that separate the overlaid upper pattern from the lower pattern. The opaque layers may be metal layers of several 10s of nm in thickness and carbon hardmasks of several μm in thickness. Metrology using optical scatterometers is challenging as the masks employed are barely transmissive for electromagnetic radiation, with the extreme case being metal masks, where electromagnetic radiation is absorbed and does not go through the metal mask at all.

Scanning acoustic microscopes (SAMs) provide a way of measuring structures comprising opaque layers. One commercially available SAM system comprises a single element ultrasound transducer operating at an acoustic frequency of 1 GHz, which is scanned over a surface of the structure. An acoustic lens made of sapphire or quartz and having a concave curvature is used to focus acoustic radiation emitted by the transducer to a focus located a fixed distance away from the transducer. Water is provided between the acoustic lens and the structure to couple the acoustic radiation into the structure. Similar to optics, the resolution of an acoustic system increases with increasing frequency of the acoustic radiation and high acoustic frequencies are needed to make measurements with high spatial resolution. However, the attenuation of acoustic radiation in water increases with the frequency in a quadratic relationship and loss of the acoustic radiation may become very significant for acoustic frequencies of 1 GHz and higher. In conventional SAM systems, the thickness of the water layer is generally greater than about 40 μm which, at an acoustic frequency of 1 GHz, results in a pressure loss of around 17 dB. Substantially higher acoustic frequencies are therefore not viable for such systems. It also becomes increasingly difficult to fabricate acoustic lenses sufficiently accurately for higher acoustic frequencies.

Using a SAM system to measure structures created by lithographic processes is challenging. The sharp and fixed focus of conventional SAM systems means that for markers present in or on the structure at different depths (e.g. in 3D NAND stacks), one would either have to perform separate scans in which only one or the markers is in focus, or accept that none of the markers in focus. Furthermore, SAM systems require the single element transducer to be scanned over a sample in two orthogonal directions to create a two dimensional image of the structure pixel by pixel, which limits measurement speed.

SUMMARY

Aspects and preferred features of the present disclosure are set out in the appended claims.

According to a first aspect of the present disclosure there is provided a metrology apparatus for determining one or more parameters of a structure fabricated in or on a semiconductor substrate. The apparatus comprises a transducer array comprising a plurality of transducers positioned in a plane, the plurality of transducers comprising at least one transmitter transducer for emitting acoustic radiation in a frequency range from 1 GHz to 100 GHz towards the structure, and at least one receiver transducer for receiving acoustic radiation reflected and/or diffracted from the structure.

BRIEF DESCRIPTION OF DRAWINGS

Embodiments of the invention will now be described, by way of example only, with reference to the accompanying schematic drawings, in which:

FIG. 3 depicts a schematic top view of a pair of non-intersecting transducer arrays;

FIG. 4 depicts a schematic top view of a pair of intersecting transducer arrays FIG. 5 depicts a schematic top view of a two-dimensional transducer array;

FIG. 6 depicts simulated acoustic waves as a function of time for acoustic radiation diffracted from a grating;

FIG. 7 depicts a method in accordance with an embodiment of the present disclosure;

FIG. 8 depicts a method in accordance with an embodiment of the present disclosure;

FIG. 9 depicts a simulated wavefield of acoustic radiation reflected and diffracted from a pair of gratings;

DETAILED DESCRIPTION

It is desirable to inspect substrates to measure properties or parameters of structures fabricated in or on the substrate, such as overlay errors between subsequent layers, line thicknesses, critical dimensions, etc. These measurements can be made using a metrology apparatus and/or method as described herein. If errors are detected, adjustments, for example, may be made to exposures of subsequent substrates or to other processing steps that are to be performed on the substrates, especially if the inspection is done before other substrates of the same batch or lot are still to be exposed or processed.

In the present disclosure, the term "radiation" is used to encompass all types of acoustic radiation, including ultrasonic radiation, and in particular, acoustic radiation having frequencies in a range from 1 GHz to 100 GHz, which may be termed "GHz frequencies". The term "transducer" is used to refer to an element that is used to convert the acoustic radiation into electrical or mechanical energy and vice versa over a range of different frequencies. For example, a transducer may be configured to have a resonant frequency from 1 GHz to 100 GHz, such that acoustic radiation in this range of frequencies may be emitted from or received by the transducer, i.e. the transducer can be excited to emit acoustic radiation having frequencies from 1 GHz to 100 GHz and/or excited by acoustic radiation it receives having frequencies from 1 GHz to 100 GHz such that signals indicative of the amplitude of the acoustic radiation can be determined from the response of the transducer to the acoustic radiation.

Figures 1, 2:
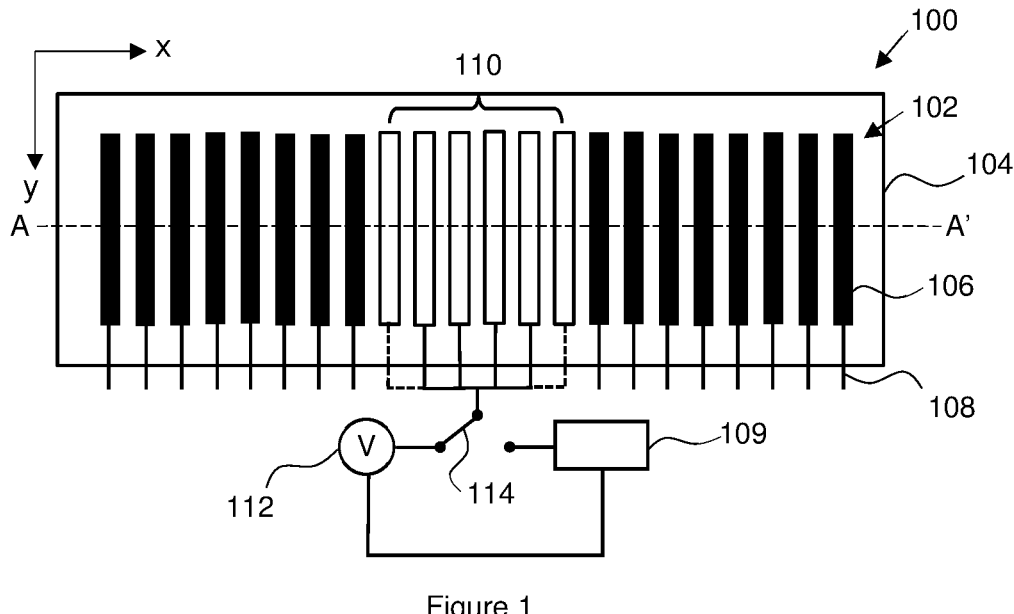
FIG. 1 depicts a schematic top view of a metrology apparatus.
FIG. 2 depicts a schematic vertical cross section of the metrology apparatus of FIG. 1.

FIG. 1 schematically depicts a metrology apparatus 100 that comprises a transducer array 102 provided on an upper face of a delay line element 104 and comprises a plurality of transducers 106 arranged along a common axis A-A'. Each of the transducers 106 has an electrical connection 108 (only a portion of which is shown in FIG. 1 for clarity) to a controller 109 that reads out signals from each of the transducers 106 that are indicative of the amplitude of acoustic radiation received by the transducer 106 as a function of time. In the present example, the transducers 106 are piezoelectric transducers that can be operated at GHz frequencies, although other forms of transducer operating at these frequencies can also be used, such as photothermal or photoacoustic transducers or magnetostrictive transducers. The transducers 106 are substantially co-planar, as can be seen in FIG. 2. The transducer array 102 may in general comprise any number of transducers that is greater than 2, such as more than 20 transducers 106, or more than 100 transducers 106, or 500 or more transducers 106, or even more than 1000 or 10000 transducers 106.

A subset of the transducers 110 are connected to a driver unit 112 that outputs a control signal to drive the transducers 110 to emit acoustic radiation with GHz frequencies. The transducers 110 that are configured to emit acoustic radiation in this way may be termed "transmitter" transducers 110 to distinguish them from the transducers 106 that are configured to receive acoustic radiation, which may be termed "receiver" transducers. In the present example, the transmitter transducers 110 are connected in parallel to the driver unit 112 so that a single switch 114 can be used to switch the transducers 110 from the transmitter configuration to a receiver configuration, i.e. to disconnect the transducers 110 from the driver unit 112 so that they cease emitting the acoustic radiation and to connect them to the controller 109 so that acoustic radiation received by the transducers 110 can be measured. Preferably, the switch 114 is a GHz switch such that the transducers 110 can be switched to the receiver mode within a nanosecond timescale (e.g. within 10 ns or less), so that the switching is completed before the arrival of acoustic radiation that has been reflected and/or diffracted back to the transducer array 102, i.e. so that one or more "echoes" of the emitted acoustic radiation can be measured across the whole extent of the transducer array 102. In some cases, the switch 114 may have a switching time of less than 50 ns, less than 25 ns, or preferably less than 15 ns. The switching time may be defined, for example, as the time taken for the voltage applied to the transducer voltage to rise from 10% of its final value to 90% of its final value. (or conversely, to fall from 90% of its initial value to 10% of its initial value).

Whilst a single switch 114 may be preferred for practical reasons, such as the ease of fabricating the metrology apparatus 100 (or cost), in some cases, a plurality of switches may be provided such that some or all of the transducers 110 can be switched between the transmitter and receiver modes independently of the others. The plurality of switches allows the number of transmitter transducers 110 to be varied (e.g. on a shot-to-shot basis) so that the aperture from which the acoustic radiation is emitted can be varied or "programmed" to modify the properties of the acoustic radiation such as its focal point (i.e. the distance away from the transducer array 102 at which the acoustic radiation forms a focus). In the example shown in FIG. 1, the transmitter transducers 110 form a continuous subset of the transducers that is located at the center of the transducer array 102. However, other arrangements are possible, such as the subset of transmitter transducers 110 being offset from the center of the transducer array 102, e.g. beginning at one end of the transducer array 102, and/or being discontinuous such that one or more receiver transducers 106 are provided between one or more adjacent transmitter transducers 110. Alternatively or additionally, the transmitter transducers 110 may be operated as a phased array to vary one or more properties of the emitted acoustic radiation, such as its direction of propagation or its focal point.

FIG. 2 schematically depicts the metrology apparatus 100 being used to make acoustic measurements of a structure 200 comprising a semiconductor (e.g. silicon) substrate 202 having a sample layer 204, fabricated in this case from silicon dioxide, and an upper grating 206 a plurality of grating elements 208 and a lower grating 210 comprising a plurality of elements 212 and spaced apart from the top grating 206 along the Z direction, i.e. in a direction that is transverse to the transducer array 102 (vertically with respect to FIG. 2). The upper grating 206 in this case is formed on a face of the sample layer 204 that is closest to the transducer array 102, while the lower grating 210 is formed on an opposing lower face of the sample layer 204, with the grating elements 212 each extending from the semiconductor substrate 202 into the sample layer 204. In general, each of the gratings 206, 210 and the transducer array 102 are arranged to be parallel to one another. The sample layer 204 may comprise a stack of two or more sub-layers, formed by a lithographic process, for example. Optionally, a grating may be provided between any of the sub-layers in the stack.

The upper and lower gratings 206, 210 may be referred to as a "metrology target". A metrology target may be an ensemble of composite gratings, formed by a lithographic process, mostly in resist, but also after etch process for example. Including a metrology target in a structure formed by a lithographic process provides a way of measuring one or more properties of the structure. For example, measurement of the lateral offset (overlay) of the upper grating 206 relative to the lower grating 210 provides information about the position of the sample layer 204 relative to the semiconductor substrate (e.g. wafer) 202. Other parameters of the grating may relate, for example, to the asymmetry in the spacing of the grating elements (the grating pitch), the thickness of the grating elements, the materials from which the grating elements are made and/or their acoustical properties, and/or the sharpness of the grating edges.

The delay line element 104 on which the transducer array 102 is provided generally has a height (i.e. extent along the Z direction) of from 25 μm to 5 mm, preferably from 50 μm to 500 μm. In this example, the delay line element 104 is made of silicon, but other materials can also be used, such as silicon dioxide, sapphire, and/or low-stiffness materials such as polyimide materials. In use, the transmitter transducers 110 emit acoustic radiation 216 towards the structure 200 in a direction parallel to the normal of the upper and lower gratings 206, 201. The acoustic radiation 216 travels through the delay line element 104 and through a layer of couplant fluid 218 (in this case, water) provided between a planar face 220 of the delay line element 104 and the upper face 214 of the sample layer 204 to facilitate transmission of the acoustic radiation 216 from the delay line element 104 into the structure 200. A portion of the acoustic radiation 216, referred to here as "first diffracted acoustic radiation", is then diffracted and reflected from the upper grating 206 into various diffraction orders. In the example shown in FIG. 2, the first diffracted acoustic radiation comprises: zeroth (0) order acoustic radiation 222, reflected from the upper grating 206 in substantially the opposite direction to the emitted acoustic radiation 216; and positive first (+1) order acoustic radiation 224 and negative first (−1) order acoustic radiation 226, each propagating from the upper grating 206 at an angle with respect to the emitted acoustic radiation 216 and the zeroth order acoustic radiation 222. The first diffracted acoustic radiation travels back through the couplant fluid 218 and the delay line element 104 to the transducer array 102, where it is received by each of the receiver transducers 106 to generate the time-varying signals that are read out by the controller 109.

Some of the emitted acoustic radiation 216 passes through the upper grating 206, travels through the sample layer 204, and is then reflected and diffracted by the lower grating 210 to generate so-called "second diffracted acoustic radiation" distributed over various acoustic diffraction orders, in this case, the zeroth (0) order 228, the positive and negative first (±1) orders 230, 232 and the positive and negative second (±2) orders 234, 236. The second diffracted acoustic radiation travels back through the sample layer 204, the fluid couplant 218 and the delay line element 104 and arrives at the transducer array 102 after the first diffracted acoustic radiation.

Whilst in general, the respective pitches of the upper grating 206 and the lower grating 210 may take any value, in the present example, the pitch of the lower grating 210 is larger than the pitch of the upper grating 206. This configuration ensures that the first order acoustic radiation 230, 232 from the upper grating 206 has a different diffraction angle (i.e. the angle the diffraction order makes with respect to the grating normal) from the first order acoustic radiation 234, 236 from the lower grating 210, which allows parameters of each of the gratings 206, 210 to be determined substantially independently of the other. In the present example, the diffraction angle of the first order acoustic radiation 234, 236 from the lower grating 210 is smaller than the diffraction the first order acoustic radiation 230, 232 from the upper grating 206. The wavefronts of the acoustic radiation arriving at the transducer array 102 meet the transducer array 102 at an angle and therefore generate a spatially-varying signal across the transducer array 102 (along the X direction shown in FIG. 2) which, for a given frequency of the acoustic radiation, can be characterised by a particular spatial frequency or wave vector ($k_x$). The different wave vectors of the first and second diffracted acoustic radiation can be distinguished by frequency domain analysis of the signals generated by the transducer array 102, e.g. using so-called $f$-$k_x$ filtering as described below.

Returning to FIG. 1, the transducers 106 have a length (i.e. extent along the elevational (Y) dimension, perpendicular to the pitch of the transducer array 102) of around 15 μm to 35 μm. This length is chosen to create a natural elevational focus of the emitted acoustic radiation 216 that is positioned in the vicinity of the upper and lower gratings 206, 210 for a delay line element 104 having a length of around 50 μm. In general, the length of the transducers 106 may be optimised for a particular thickness of the delay line element 104 and vertical positions of the upper and lower gratings 206, 210 so that the natural elevational focus is appropriately positioned. In some cases, the length of the transducers may be from 10 μm to 100 μm. Further focusing and/or beam steering may be achieved by operating the transducer array 102 as a phased array. The use of a transducer array 102 in combination with the delay line element 104 may therefore eliminate the need for a physical acoustic lens between the transducer array 102 and the structure 200. The delay line element 104 also allows the emitted acoustic radiation 216 to be transmitted to the structure 200 using a couplant fluid layer of minimal thickness, e.g. having a thickness (i.e. extent along the Z direction, perpendicular to the normal of the transducer array 102) in a range from 0.1 μm to 5 μm. The minimal thickness of the couplant fluid 218 reduces the attenuation of the acoustic radiation that would otherwise occur as it passes through the couplant fluid 218, which is particularly significant for GHz frequencies (compared to MHz frequencies of acoustic radiation, for example). The planar face 220 of the delay line element 220 is therefore preferably made flat and smooth to enable a small, uniform thickness of the couplant fluid 218 to be used. For example, the planar face 220 may be flat to within 1 μm, or 100 nm, or even 10 nm, over and area of 20 μm×20 μm, or over an area of 50 μm×50 μm. Such flatness can be achieved straightforwardly with existing fabrication techniques for silicon, for example.

The delay line element 104 provides a number of additional advantages. It acts as a support for the transducer array 102 that is of sufficient thickness and mechanical strength to allow safe handling of the transducer array 102. It also allows the transducer array 102 to be supported only on its bottom face (i.e. the face nearer to the structure 200), which avoids losses due to acoustic radiation being emitted away from the sample (i.e. in the negative Z direction in FIG. 2) as a result of how the transducer array 102 is mounted. The delay line element 104 also increases the time (i.e. delay) between the acoustic radiation 216 being emitted and the reflected and/or diffracted acoustic radiation 222-236 arriving at the transducer array 102, which may allow sufficient time for some or all of the transmitter transducers 106 to be switched to being receiver transmitters. The delay also allows longer acoustic pulses of the emitted acoustic radiation 106 to be used, which means that the control signal used to excite the transmitter transducers 110 can be structured or coded to provide the emitted acoustic radiation 216 with a higher bandwidth, which in general allows measurements to be made with a higher signal to noise ratio as a result of the measurements being made at a number of different frequencies simultaneously. For example, in some cases a chirp (typically a linear chirp) is applied to the control signal so that the frequency of the emitted acoustic radiation 216 varies over the duration of the acoustic pulse. The delay arising from the delay line element 104 also allows sufficient time for shear waves or "echoes" formed by reflection of the emitted acoustic radiation 216 from interfaces, such as the interface between the delay line element 104 and the couplant fluid 218, to dissipate or travel away before the reflected and/or diffracted acoustic radiation reaches the transducer array 102, thereby avoiding or reducing interference in the measurement of the received acoustic radiation. For example, shear waves resulting from the emitted acoustic radiation 216 may arrive at the transducer array 102 at similar times to the compressional waves generated by reflection and/or diffraction of the emitted acoustic radiation 216 from the gratings 206, 210 (particularly as the shear waves may have an approximately two times lower wave speed than the compressional waves). The length of the delay line element 104 may be tuned to prevent the shear waves and the reflected and/or diffracted compressional waves from arriving at the transducer array 216 at overlapping periods in time, such that "time windowing" (i.e. gating over a certain time interval) can be used to extract signals produced by substantially only the compressional waves generated from the interaction of the emitted acoustic radiation 216 with the structure 200.

The frequency of the emitted acoustic radiation 216 may in general be chosen according to the structure 200 being studied and may depend on its composition and its associated acoustic properties, for example. A frequency of 1 GHz or more is generally preferred to ensure a high level of accuracy for structures in silicon or silicon dioxide and having gratings spanning an area of 20 $\mu m^2$ or less. Higher frequencies may be preferred for various reasons, such as to probe smaller length scales or to allow pulses of higher bandwidth to be created. The maximum frequencies that can be used may be limited by the thickness of the fluid couplant 218 and how flat the planar face 220 of the delay line element 220 and the upper face 214 of the structure 200 are and the degree to which they can be made parallel to one another. For some structures, frequencies of up to about 100 GHz may be used, although frequencies in a range from 1 GHz to 10 GHz may be preferred for many applications, e.g. to reduce the attenuation of the acoustic radiation in the fluid couplant 218.

The pitch of the transducer array 102 (i.e. the distance between the centres of adjacent transducers 106 along the X direction) may be optimised depending on a target operating frequency and/or the characteristics of the structure 200 being analysed. Preferably, the pitch is chosen to be of the order of the acoustic wavelength in silicon at the target operation frequency, more preferably half of the acoustic wavelength in silicon (or smaller) at the target operation frequency so that the received acoustic radiation is sampled can be sampled optimally and to ensure a high level of control when operating the transducer array 102 as a phased array. For example, the pitch of the transducer array 102 may be from 400 nm to 4 μm for target operating frequencies from 10 GHz to 1 GHz. The pitch may also vary in different parts of the transducer array 102 depending on how the transducer is to be used. For example, the pitch of the transducers 110 in the centre of the transducer array 102 may be smaller than the pitch of the transducers 106 towards the edges (i.e. extremities) of the transducer array 102. A smaller size/pitch of the transducers 106 away from the centre of the transducer array 102 may be preferred because these transducers 106 receive acoustic radiation that has been diffracted through an angle and therefore has a higher wavelength across the transducer array 102 and it can therefore be sampled effectively with a lower spatial frequency For the centrally located transducers 110, the size and/or pitch of the transducers can be large because the returning acoustic radiation in the centre of the array 102 is essentially a normally-incident plane wave. Further away from the centre of the transducer array 102, the wavefronts of the acoustic radiation arrive at an angle (relative to the normal of transducer array 102), leading to a spatial variation of the amplitude of the acoustic radiation across the transducer array 102, A higher density of transducers 102 is therefore preferred away from the centre to measure this spatial variation accurately. To minimize the number of transducers 106 that are required, the pitch of the transducer array may be varied from the centre of the transducer array as an increasing function of the angle of incidence of the acoustic radiation with respect to the transducer array.

FIG. 3 shows a metrology apparatus 300 that is similar to the metrology apparatus 100 described in connection with FIGS. 1 and 2, except that a second transducer array 302 is provided on the delay line element 104 in a spatially separate region from the transducer array 102. In the present example, the transducer arrays 102, 302 are at right angles to each other to allow measurements of orthogonal gratings provided in or on the structure 200, e.g. to determine a two dimensional offset (overlay) between the two gratings. The second transducer array 302 may in general have any orientation within the plane of the delay line element 104 (i.e. within the XY plane in FIG. 3). However, it is generally preferred that the two transducer arrays 102, 302 are not co-linear in order to allow two-dimensional information about the structure 200 to be obtained using the metrology apparatus 300.

FIG. 4 shows a further metrology apparatus 400 comprising two orthogonal intersecting transducer arrays 402A, 402B, which comprise a plurality of transducers 410 that are common to both arrays and arranged as a two-dimensional array (matrix). These transducers may be configured as transmitter transducers to allow control of the emitted acoustic radiation along two-dimensions. Each array 402A, 402B also comprises transducers 106, positioned on either side of the transducers 410, that are not shared with the other array and which are the same or similar to the transducers 106 used in the linear transducer arrays 102, 302. The transducers 410 in the centre of the two-dimensional array may generally be smaller than the transducers 106 used in the linear transducer arrays 102, 302. In the present example, the transducers 410 are square while the other transducers 106 are rectangular, but other shapes can of course be used.

FIG. 5 shows another metrology apparatus 500 comprising a two-dimensional array (matrix) of transducers 502 provided on the delay line element 104. In this example, the size of the transducers and pitch of the transducers varies for different regions of the two-dimensional array 502, with smaller transducers being provided towards the centre of the matrix 502 and larger transducers being provided towards its periphery. Alternatively, the two-dimensional array 502 may be arranged such that larger and/or more distantly spaced transducers may be provided towards the centre of the array 502, with smaller and/or more closely spaced transducers being provided towards the periphery. Although the two-dimensional array 502 can be manufactured using transducers that are all the same size and shape, the configuration shown in FIG. 5 is more economical for many applications, e.g. in terms of the wiring and electronics needed to read out the signals from each of the transducers. The wiring of the transducers can be simplified by providing an Application-Specific Integrated Circuit (ASIC) on top of the two-dimensional array 502.

Time Delays Between Acoustic Radiation of Different Acoustic Diffraction Orders

FIG. 6 shows an example of simulated signals 602, 604 of the amplitude of acoustic radiation as a function of time, as detected by two receiver transducers 106 of an transducer array 102, 402A, 502 located on either side of the centre of the array following diffraction of the acoustic radiation 216 from a structure having a single grating (in this case an upper grating 206). The horizontal axis in FIG. 6 is the time in nanoseconds since the acoustic radiation 216 was emitted, whilst the vertical axis is the out-of-plane stress of the received acoustic radiation in N/m².

The acoustic radiation 216 emitted by the transducer array 102, 402A, 502 arrives at the grating substantially along a direction normal to the grating 206. The receiver transducers 106 receive respective acoustic radiation in the +1 and −1 acoustic diffraction orders 226, 224. If the grating is aligned perfectly centrally with respect to the emitted acoustic radiation 216 then the diffracted acoustic radiation arrives at the each of the receiver transducers 106 at the same time and the signals 602, 604 obtained from the transducers would therefore be essentially identical. However, a lateral offset of the grating 206 along a direction parallel to the pitch of the transducer array 102, 402A, 502 (i.e. along the X direction in FIG. 2) causes the arrival time of the acoustic radiation in the +1 acoustic diffraction order to differ from the arrival time of the acoustic radiation in the −1 acoustic diffraction order. In the exemplary signals 602, 604, the difference in the arrival times arises from a lateral offset of 100 nm. The time difference between the +1 acoustic diffraction order and the −1 acoustic diffraction order is typically of the order of 0.25 picoseconds per nm of lateral offset.

The time difference between the two signals 602, 604 can be determined by taking the difference between one or more characteristic times determined for each of the signals. The characteristic times can be determined in a number of ways, such as: determining the time(s) for each signal 602, 604 to reach a particular amplitude, determining one or more times associated with maxima or minima in the signals; and/or determining the time(s) at which the amplitude of each signal 602, 604 is zero (i.e. identifying the zero-crossings of each signal 602, 604).

Another preferred method of determining the time difference is to cross-correlate the signals 602, 604 and then determine the time at which the cross-correlation function takes its maximum value.

Various signal processing techniques can be used to improve the accuracy of these approaches, such as curve fitting and/or interpolation with a known relation (e.g. a polynomial or sinusoid). One preferred method of interpolation is to use sinc-interpolation or zero-padding in the frequency domain as this provides theoretically ideal interpolation for band-limited signals.

Once the time difference has been determined, it can be used to determine the lateral offset of the grating 206, 210 with respect to the transducer array 102, 402A, 502 according to the following formula:

$$\Delta t = \frac{\sqrt{(X_{-1} + \Delta x)^2 + Z^2} - \sqrt{(X_{-1} - \Delta x)^2 + Z^2}}{c}$$

In this equation, $\Delta t$ is the time difference, $X_{-1}$ is the location (on the X axis) of the receiver that receives the −1 acoustic diffraction order acoustic radiation with respect to the centre of the transducer array (i.e. the origin of emitted acoustic radiation 216), $X_{+1}$ is the location (on the X axis) of the receiver that receives the +1 acoustic diffraction order acoustic radiation, $\Delta x$ is the lateral offset of the grating 206, 210 with respect to the centre of the transducer array, Z is the axial depth of the grating relative to the transducer array (i.e. distance along the Z axis), and c is the acoustic wave speed. $X_{+1}$ and $X_{-1}$ are known accurately known based on the geometry of the transducer array 102, Z can be determined from the time of arrival of the zeroth order acoustic radiation reflected from the grating.

Preferably, the receiving transducers from which the signals 602, 604 are obtained are located where the amplitude of the first (i.e. n=+1 and n=−1) acoustic diffraction order is highest in order to maximise the signal to noise in the signals 602, 604. Although a minimum of two receiver transducers is required, the accuracy with which the time difference between the two acoustic diffraction orders can be determined may in some cases be improved by using signals obtained from other pairs of receiver transducers 106 in the transducer array 102, 402A, 502, as this allows for more advanced signal processing. Preferably, the transducers 106 in each of the pairs is equidistant from the centre of the transmitter transducers 110 so that the arrival times of the diffracted acoustic radiation at each of the transducers is as similar as possible.

Although FIG. 6 relates to measurements of the +1 and −1 acoustic diffraction orders, in general any two acoustic diffraction orders may also be used, although it is preferable to use corresponding acoustic diffraction orders of opposite sign (i.e. ±1, ±2 . . . ±n) to facilitate comparison of the signals 602, 604 as the amplitudes and spatial and temporal profiles of the received acoustic radiation in the positive and negative acoustic diffraction orders will be very similar to one another.

FIG. 7 shows the steps of an exemplary method 700 of determining one or more parameters of a grating 206, 210 fabricated in or on a semiconductor substrate. The method 700 may be implemented using the metrology apparatus 100, 300, 400, 500. The method comprises:

702 (Tx): emitting acoustic radiation in a frequency range of 1 GHz to 10 GHz towards the grating 206;

704 (Rx): receiving the acoustic radiation diffracted from the grating 206 into respective first and second acoustic diffraction orders and obtaining respective first and second signals indicative of the amplitude of the received acoustic radiation in the first and second acoustic diffraction orders as a function of time; and 706 (CALC): determining a time difference between the signals and using the time difference to determine the one or more parameters of the grating 206.

It will be appreciated that referring to the acoustic diffraction orders as "first" or "second" acoustic diffraction orders does not necessarily imply that n=1 for the first acoustic diffraction order or that n−2 for the second acoustic diffraction order (where n is an integer that is used conventionally to label diffraction orders in terms of ascending diffraction angles). In general, the first and second acoustic diffraction orders may have any value of n, i.e. n=0, ±1, ±2, ±3 etc.

FIG. 8 shows the steps of an exemplary method 800 that is similar to method 700, except that one or more parameters of another grating (e.g. the lower grating 210) is also determined. In this case, the step Rx 704 comprises two sub-steps Rx1 804 and Rx2 806, which comprise:

(Rx11) 804: receiving first acoustic radiation diffracted from a first grating fabricated on or in the structure into respective first and second acoustic diffraction orders of the first grating 206 and obtaining respective first and second signals for the first grating 206 indicative of the amplitude of the received first acoustic radiation in the first and second acoustic diffraction orders of the first grating 206 as a function of time.

(Rx2) 806: receiving second acoustic radiation diffracted from a second grating 210 fabricated on or in the structure and separated from the first grating 206 into respective first and second acoustic diffraction orders of the second grating 210, and obtaining respective first and second signals indicative of the amplitude of the received second acoustic radiation in the first and second acoustic diffraction orders of the second grating 210 as a function of time.

The CALC 808 step, then comprises determining a time difference between the first and second signals of the first grating and a time difference between the first and second signals of the second grating. The CALC 808 step may also comprise determining a parameter from the one or more parameters obtained for each of the grating 206, 210. For example, a lateral offset (along the X direction) may be calculated for each grating 206, 210 with respect to the emitter of the acoustic radiation (i.e. the transducer array 102), and the two offsets used to obtain a relative offset of one grating 206 relative to the other 210.

While the method of determining a lateral offset of the grating(s) described in connection with FIGS. 6 to 8, involves determining a time delay between acoustic radiation of first and second acoustic diffraction orders, it is also possible to determine the lateral offset by determining a phase difference between acoustic radiation of the first and second acoustic diffraction orders. This method may be preferred when offsets need to be determined for the two gratings are relatively closely spaced to one another, e.g. separated by less than 2 μm when 5 GHz acoustic radiation is used, such that the acoustic radiation reflected and diffracted by each of the two gratings 206, 210 arrives at the transducer array 102, 402A at substantially the same time, i.e. there is a temporal overlap between the "echoes" from the two gratings.

In this case, first signals obtained from the transducers 106 that receive the acoustic radiation from the positive acoustic diffraction orders of the two gratings (e.g. the transducers 106 shown on the right hand side of FIG. 2) can be compared with second signals obtained from the transducers 106 that receive the acoustic radiation from the negative acoustic diffraction orders of the two gratings (e.g. the transducers 106 shown on the left hand side of FIG. 2). The phase difference between the positive and negative diffraction orders may then be obtained by performing a Fourier transform on the first and second signals. Due to the interference of the acoustic radiation diffracted from the first and second gratings, the frequency dependent relation of the phase and the lateral offset between the gratings is complex. Thus it is helpful to find an optimal frequency range for which to evaluate the phase difference. The frequency range depends on a number of factors, such as the geometries of the transducer array 102, 402A, 502 and the first and second gratings, the thickness of the delay line (on which the transducers 106 are mounted), and the acoustical properties of the gratings 206, 210. The optimal frequency range may be determined empirically using gratings for which the offset is already known, or by using acoustic simulations of the acoustic radiation propagating through the metrology apparatus 100, 300, 400, 500. Preferably, the frequency range is selected such that a linear relation is found between the obtained phase difference and the lateral offset between the two gratings.

The phase difference may be converted into a lateral offset between the two gratings 206, 210 by calculating the path length between the elements of the grating and each of the receiver transducers 106.

It is preferable to remove the effects of the propagation of the acoustic radiation it has been diffracted from each of the gratings. This may be done by performing wavefield extrapolation or migration of the first and second signals as described below.

Acoustic Imaging

For structures 200 that comprise two gratings 206, 210 axially offset from one another (e.g. offset in the Z direction shown in FIG. 2), the metrology apparatus 100, 300, 400,

500 may be used to determine one or more parameters of each grating 206, 210. The transducer array 102, 302, 402A, 402B, 502 can be configured to emit short pulses of the acoustic radiation 216 such that the acoustic radiation diffracted and/or reflected from each grating 206, 210, arrives back at the transducer array as temporally separated (i.e. non-overlapping) pulses. For example, the emitted acoustic radiation 216 may have a mean frequency of 5 GHz and be emitted as a pulse comprising 1 to 15 cycles of the acoustic radiation (or preferably 2 to 5 cycles). The gratings 206, 210 may typically be axially separated from each other by from 3 μm to 10 μm, in which case the returning pulse from each of the gratings 206, 210 may be separated from one another in time by from around 1.0 ns to around 3.3 ns. The GHz response times of the receiver transducers 106 provides a temporal resolution that allows the returning pulses to be distinguished from one another in time in the signals obtained from each of the transducers 106. In some circumstances, longer pulses (e.g. from 50 to 1000 cycles) of the emitted acoustic radiation 216 may be preferred so that the bandwidth of the pulse can be increased of the pulse. For example, a coded excitation pulse may be created by using a coded excitation signal to excite the transmitter transducers 110. The coded excitation signal may comprise any waveform in which there is a temporal variation in one or more of a phase, amplitude and frequency of the waveform, e.g. the waveform may comprise a non-linear phase modulation. In some cases, the coded excitation signal may be comprise a sequence of binary values. In one preferred embodiment, the coded excitation pulse is chirped, (the pulse may have a linear chirp, for example). The coded excitation signal may be chosen such that signal processing techniques such as pulse compression can be used to improve the accuracy of the measurements. For example, the emitted acoustic radiation 216 may be a relatively long, broadband pulse (e.g. a chirped pulse), which is scattered by the gratings 206, 210, or other features of the structure 200, to produce a long and complex pulse of returning acoustic radiation that is received by the transducers 106. A pulse compression algorithm may then be used to compare the signals obtained from the transducers 106 with the coded excitation signal (e.g. by cross-correlation and filtering) to produce a much shorter signal ("compressed pulse") from which the properties of the gratings (e.g. lateral offset) can be determined more accurately.

The transducer array 102, 302, 402A, 402B, 502 may be configured to focus the emitted acoustic radiation 216 close to the gratings 206, 210 to minimise the pulse length (i.e. duration) of the reflected and/or diffracted acoustic radiation. This can be done by reducing the length (or area) of the emitted acoustic radiation 216 on the gratings 206, 210 (i.e. reducing the length/area that is "illuminated" by the emitted acoustic radiation 216) or by applying a chirp to the emitted acoustic radiation 216 such that there is temporal focusing of the reflected and/or diffracted acoustic radiation as it returns to the transducer array 102, 302, 402A, 402B, 502.

The signals obtained from the transducers 106 as a function of time may be referred to collectively as a time domain wavefield. For a linear array 102, 402A, the wavefield comprises the amplitude of the acoustic radiation detected by the transducers 106 as a function of transducer position along the array (i.e. along a direction parallel to the pitch of the array, the X direction in FIGS. 1 and 2) and time following the emission of the acoustic radiation 216. Similarly, where a two-dimensional transducer array 500 is used, the wavefield may be the amplitude of the acoustic radiation detected by the transducers 106 as a function of the transducer position with the two-dimensional array (e.g. along each of the X and Y directions in FIGS. 4 and 5) and time following the emission of the acoustic radiation 216.

FIG. 9 shows an example of a simulated wavefield 900 detected by a linear transducer array 102, 402A and comprising signals 902 indicative of acoustic radiation reflected and diffracted by a first grating 206 and signals 904 indicative of acoustic radiation reflected and diffracted by a second grating 210 located further away from the transducer array 102, 402A than the first grating 206. In FIG. 9, the amplitude of the acoustic radiation is shown by the darkness of the wavefield. In this example, the first grating 206 comprises seven grating elements 208 having a pitch of 1.2 μm and the second grating 210 comprises seven grating elements 212 having a pitch of 2.4 μm. The first and second gratings 206, 210 are separated from one another (along the Z direction) by 10 μm.

Figure 10:
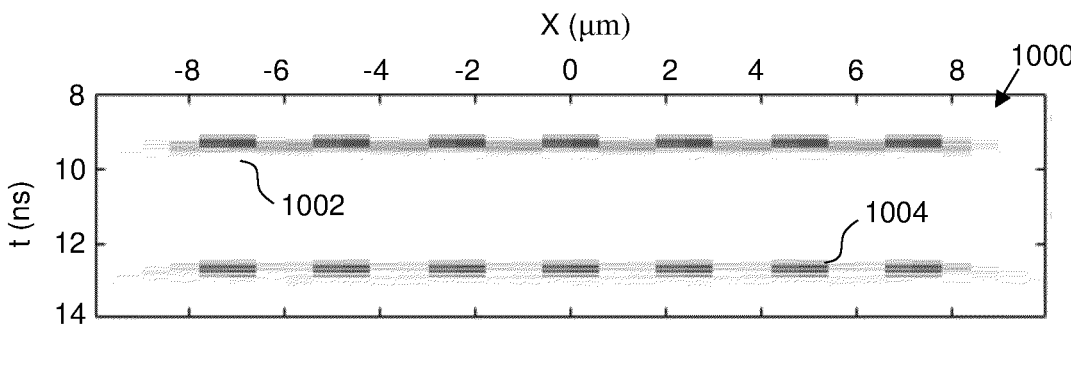
FIG. 10 depicts the simulated wavefield of FIG. 8 following application of a migration algorithm.

FIG. 10 shows the simulated wavefield 1000 after application of a migration algorithm to remove the effects of propagation of the acoustic radiation following reflection/diffraction from each of the gratings 206, 210. In this case, a Stolt migration algorithm was used, details of which are available in G. F. Margrave, Numerical Methods of Exploration Seismology, University of Calgary, 2003. As can be seen in FIG. 10, the simulated wavefield 1000 after application of the migration algorithm spans a much smaller length than the wavefield 900 measured at the transducer array, and comprises two distinct portions corresponding to respective representations 1002, 1004 of the acoustic radiation at each grating 206, 210, in which the individual grating elements can be resolved. Similar results can be obtained using wavefield extrapolation and/or delay-and-sum beamforming rather than Stolt migration.

The representations 1002, 1004 of the acoustic radiation at each grating 206, 210 may be separated from one another by time-windowing (i.e. time domain filtering or masking). The representations 1002, 1004 can then be used to estimate the lateral offset (i.e. the offset along the X direction) of each of the gratings 206, 210 with respect to the transducer array 102, 402A. In general, it may not be practical to have a sufficiently high spatial sampling frequency for the transducer array to determine very small offsets, of the order of 10s or 100s of nm. It is therefore beneficial to interpolate the representations 1002, 1004, e.g. by zero-padding in the spatial frequency domain. In some cases, it may be desired to calculate the lateral offset of one grating 206 relative to the other 210. A preferred method of determining such a relative offset comprises determining a two-dimensional cross-correlation function of the two, preferably interpolated, representations 1002, 1004 and determining a distance (along the X direction) of the maximum of the cross-correlation function. Alternatively or additionally, the location of the maxima of side lobes in the cross-correlation function may be used to determine the lateral offset of each of the gratings 206, 210.

The separate (time-windowed) representations 1002, 1004 may be migrated or wavefield extrapolated back to the location of the transducer array 102, 402A and one or more time differences of different orders of diffracted acoustic radiation may then be estimated, as described above in connection with FIG. 6. This approach allows separate estimates of the lateral offset of each grating 206, 210 to be made from which the relative lateral offset (overlay) of the gratings 206, 210 can be determined.

Spatial Frequency Filtering

For structures 200, in which the gratings 206, 210 are closely separated, e.g. having an axial spacing (along the Z direction) of 1 μm or less, then it may not be possible to achieve sufficiently short pulses of the emitted acoustic radiation 216 for signals from each of the gratings 206, 210 to be resolved separately from one another. In such circumstances, the wavefield arising from each of the gratings 206, 210 may be estimated using frequency domain processing of the signals received from the transducer array 102, 402A.

Figure 11:
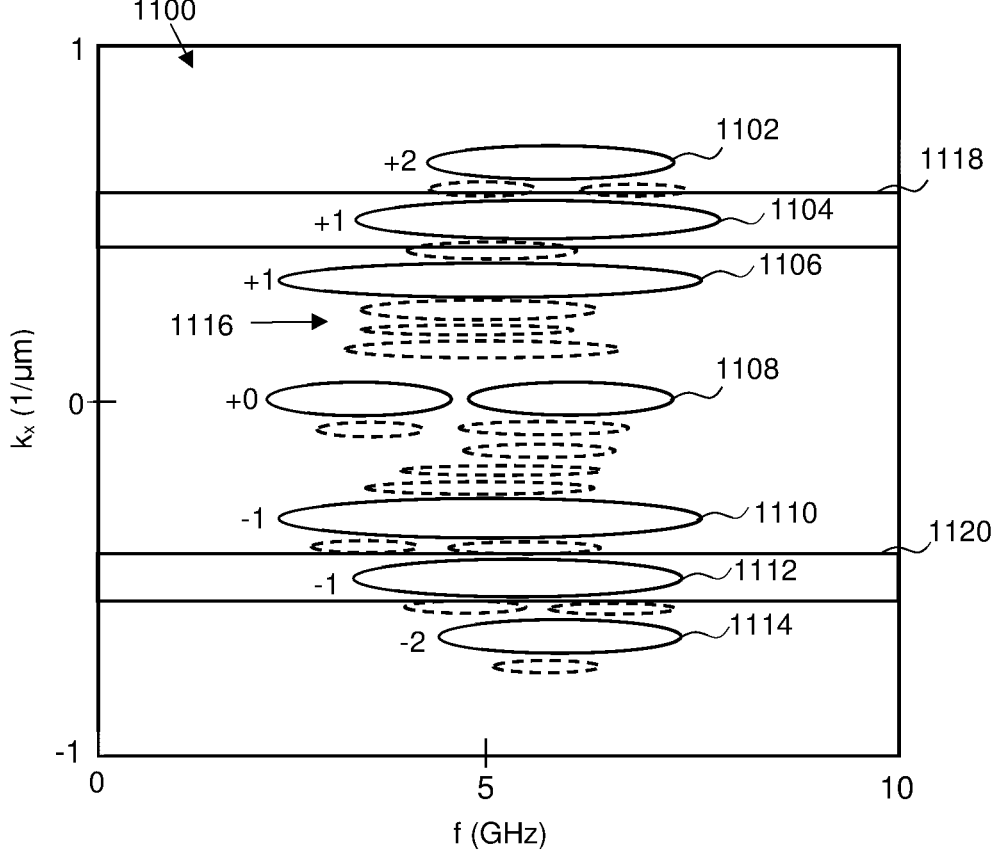
FIG. 11 depicts a schematic two-dimensional Fourier transform of simulated signals produced by a transducer array in response to an acoustic wavefield diffracted from a pair of reflection gratings.

FIG. 11 shows a schematic contour plot of a two-dimensional Fourier transform or spectrum 1100 of a wavefield reflected and diffracted from first and second gratings. In this example, the first grating is located at an axial distance of 50 μm from the receivers and has a pitch of 2 μm, while the second grating is located at an axial distance of 51 μm and has a pitch of 3 μm. The two-dimensional spectrum 1110 is obtained by Fourier transforming the wavefield with respect to the spatial X direction (i.e. distance of each receiver transducer along the transducer array 102, 406A) and with respect to time. The axes of the spectrum 1100 therefore correspond to a spatial wavevector, $k_x$ (vertical axis with units of reciprocal μm) and a frequency (horizontal axis with units of GHz). The spectral intensity of the spectrum 1100 is concentrated around a frequency of 5 GHz, which is the centre frequency of the emitted acoustic radiation 216, with the spread about this frequency arising from the bandwidth of the emitted acoustic radiation 216. The spectral intensity is also divided into regions corresponding to the main lobes of different orders of the acoustic radiation diffracted from each of the gratings. From high to low values of spatial wavevector, $k_x$ these regions correspond to the different acoustic diffraction orders as follow: +2 order of the second grating 1102; +1 order of the first grating 1104, +1 order of the second grating 1106, $0^{th}$ order (reflection) from the first and second grating; −1 order of the second grating 1110; −1 order of the first grating 1112; and −2 order of the second grating. Also observable in the spectrum are weaker features corresponding to side-lobes 116 of the various diffraction orders that arise from the finite aperture of the transmitter transducers 110. Physically, the different spatial wavevectors, $k_x$, of the diffraction orders 1102-1114 are formed because the diffracted acoustic radiation in each of the acoustic diffraction orders intersects the transducer array 102, 402A at a different angle.

Preferably, the pitches of the first and second gratings should be chosen such that the spatial wavevectors of the acoustic radiation diffracted from each of the gratings do not overlap in the spectrum 1100. In other words, the pitches should be chosen so that spatial frequency components of the acoustic radiation diffracted by the first grating spans a different range of spatial frequencies from spatial frequency components of the simulated acoustic radiation diffracted the second grating. This separation of the spatial frequency components allows signals arising from the acoustic radiation diffracted from each grating to be distinguished from one another. For example, after determining the two-dimensional spectrum 1100, masks 1118, 1120 can be applied to the regions of the spectrum corresponding to the diffraction orders 1104-1112 of the first grating. Each mask 1118, 1120 comprises a lower spatial wavevector value and an upper spatial wavevector value. Each wavevector value is chosen to lie between the respective +1 and −1 acoustic diffraction orders of the first grating and the nearest-neighbour diffraction orders of the second grating. For example, the wavevector values may be determined from a criterion based on the spectral intensity of the received acoustic radiation in the first acoustic diffraction orders 1104, 1112 of the first grating, e.g. the lower and upper values are chosen so that more than 90%, or more than 95%, of the integrated spectral intensity for the diffraction order is contained between them, or as the wavevector values corresponding to local minima in the spectrum 1100 between the acoustic diffraction orders. In one embodiment, the spatial frequency corresponding to the maximum spectral intensity of the first acoustic diffraction order is found and then the lower and upper values for the mask are determined according to the spatial frequencies (away from the maximum) at which the spectral intensities fall below a particular threshold, e.g. −20 dB relative to the maximum spectral intensity. The time domain representation of the wavefield of the acoustic radiation diffracted from the first (or second) grating can then be determined by performing an inverse Fourier transform using the values of the spectrum 1100 within (outside) the masks 1104, 1112 and taking the real part. The time domain wavefield can of the acoustic radiation diffracted from second grating can also be determined, e.g. by subtracting the wavefield determined for the first grating from the overall wavefield obtained from the transducer array 102, 402A. This process of removing or filtering certain spatial frequencies may be referred to as "f-$k_x$ filtering". Parameters of each grating can then be determined separately using any of the methods described above, e.g. a method based on time delays as described above in connection with FIG. 6.

The relative amplitudes of the main 1102-1114 and side-lobes 1116 may vary (e.g. depending on the properties of the grating), but generally the amplitude of each side-lobe is much less than the amplitude of the corresponding main lobe, e.g. in one example, the side-lobes 1116 of the various diffraction orders appearing in the two-dimensional Fourier spectrum 1100 were found to have an amplitude of around −20 dB, whilst the regions corresponding to the main lobes of the different acoustic diffraction orders 1104-1112 had an amplitude of around −3 dB. The side-lobes 1116 of one diffraction order may extend into the regions of the spectrum corresponding to the main lobe of another acoustic diffraction orders 1104-1112. Thus, the overlap between side-lobes 1116 and main lobes 1104-1112 of the acoustic diffraction orders may prevent the signals from each of the gratings being separated perfectly from each other using by filtering/masking based on spatial wavevectors. This issue may be particularly problematic when trying to estimate small lateral offsets for each of the gratings, e.g. lateral offsets of from 1 nm to 200 nm.

Each acoustic diffraction order 1104-1114 will have a series of side-lobes 1116 of diminishing amplitude on either side of the main lobe. The location of the side-lobes for small lateral offsets of the gratings can be calculated with good accuracy based on the geometry of the gratings and the transducer array 102, 402A, 502. Based on this calculation, the main lobe of an acoustic diffraction order of the first grating can be optimally located between two side-lobes of an acoustic diffraction order of the second grating. In this way, "pollution" of the calculated lateral offset of the first grating relative to the transducer array 102, 402A caused by a lateral offset of the second grating relative to the transducer array 102, 402A can be limited. Alternatively or additionally, a correction factor or function may be calculated with which to correct the measured lateral offsets. The correction factor or function may be determined empirically using one or more structures 200 for which the lateral offsets of the gratings are known accurately.

The gratings 206, 210 may also be apodised to suppress the side-lobes. Apodisation of a grating as used herein refers to varying one or more properties of the grating elements 208, 212 along a direction of the pitch of the grating to modify the spatial profile of acoustic radiation reflected and/or diffracted from the grating.

Figures 12, 13, 14:
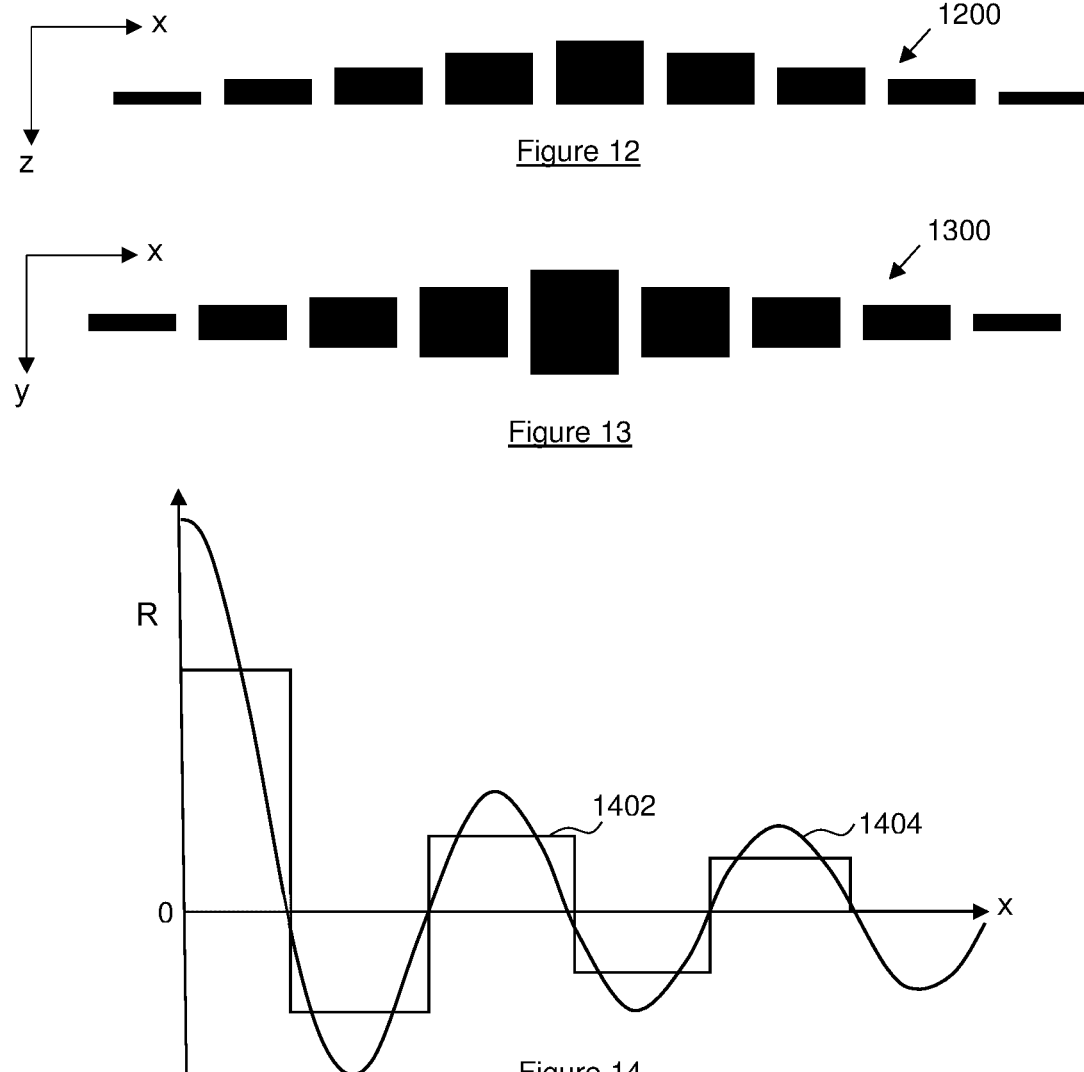
FIG. 12 schematically depicts an apodised grating.
FIG. 13 schematically depicts another an apodised grating.
FIG. 14 depicts pressure reflection coefficients of grating elements of a grating apodised according to a discretised Bessel function.

FIG. 12 shows an apodised grating 1200 in which the height of the grating elements (i.e. their extent in the Z direction, along which the acoustic radiation 216 is emitted) varies across the grating (i.e. along the X direction). In this example, the height of the grating elements increases linearly towards the centre of the grating and then decreases linearly thereafter.

FIG. 13 shows another apodised grating 1300 in which the length of the grating elements (i.e. their extent in the Y direction, transverse to the pitch of the grating) varies across the grating (i.e. along the X direction). In this example, the length of the grating elements increases linearly towards the centre of the grating and then decreases linearly thereafter.

The gratings may also be apodised by varying the acoustical properties of the grating elements, e.g. by varying their elastic properties, such as by making the grating elements of different materials or varying their thickness (i.e. extent along the Z direction), or varying the acoustic impedance of the grating elements.

In one embodiment, the apodised grating may be configured such that the spatial profile of the diffracted acoustic radiation is less divergent than for a corresponding grating with uniform grating elements. For example, the apodised grating may be configured so that the diffracted acoustic radiation is a so-called "Bessel beam" having a spatial profile corresponding to a Bessel function of the first kind. Such Bessel beams are non-diffractive and do not therefore diverge in the manner of more conventional shapes of beam, e.g. beams with a Gaussian spatial profile. A Bessel beam may be created by varying one or more properties of the grating elements as described above, such that the pressure reflection coefficient of each element in a grating varies according to a discretised Bessel function of the first kind, e.g. a zeroth order Bessel function of the first kind.

FIG. 14 shows a graph of the pressure reflection coefficient (R) 1402 of each of five grating elements as a function of distance along the grating (X), with a superimposed zeroth order Bessel function of the first kind. The 'negative' pressure reflection coefficient (R) that is required for the second and third elements can be achieved by changing the acoustic impedance of the grating element to be correspondingly higher than the surrounding medium (if for the neighbouring elements the acoustic impedance of said grating element is lower than the surrounding medium) or vice versa. This configuration changes the sign of the reflected acoustic radiation as required.

Figure 15:
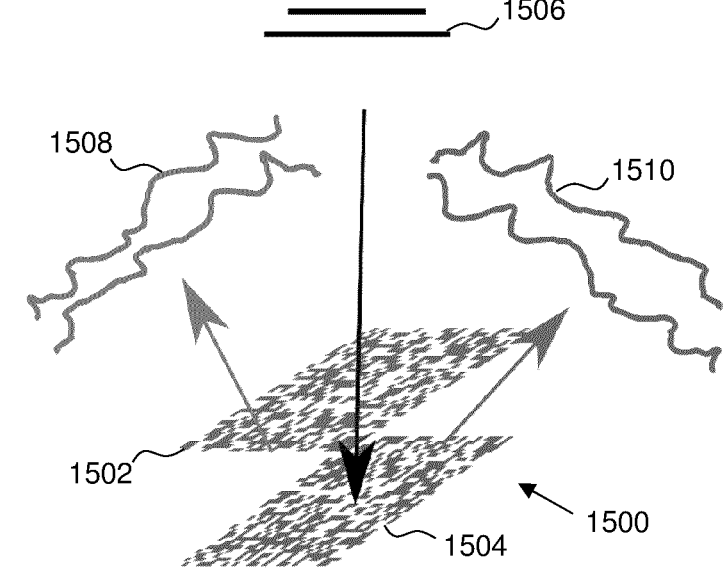
FIG. 15 depicts a schematic perspective view of acoustic radiation scattered from a pair of random gratings.

FIG. 15 shows an example of a metrology target 1500 for use in a compressed sensing method and comprising an upper structure 1502 and a lower structure 1504, each provided in or on a semiconductor substrate (not shown) and being separated from on another along an axial direction. Each of the structures 1502, 1504 comprises a different two-dimensional random calibrated pattern which resembles a QR code. In use, acoustic radiation 1506 from a transducer array 102, 402, 502 is emitted towards the metrology target 1500 and then reflected and diffracted from the upper structure 1502 to produce first scattered acoustic radiation 1508. The acoustic radiation 1506 is also scattered by the lower structure 1504 to produce second scattered acoustic radiation 1510. The first and second scattered acoustic radiation 1508, 1510 is received by the transducer array 102, 402, 502. The metrology target 1500 is then translated relative to the transducer array 102, 402, 502 and the process repeated to accumulate signals indicative of the first and second scattered acoustic radiation 1508, 1510 reflected and diffracted from different parts of the metrology target 1500. A reconstruction method (an iterative reconstruction method, for example) is then used to produce images of the upper and lower structures 1502, 1504 based on the signals obtained from each of the transducers in the transducer array 102, 402, 502. Suitable reconstruction methods are known from the literature in the field of compressed sensing. As the random pattern of each of the structures 1502, 1504 is known a priori, the images can be used to determine the positions of each structure 1502, 1504. Alternatively or additionally, acoustic representations of the structures 1502, 1504 may be formed using a wavefield migration or extrapolation technique, e.g. as described above in connection with FIGS. 9 and 10. A two-dimensional cross-correlation function of each of the acoustic representations of the structures 1502, 1504 can then be used to determine the locations of each of the structures 1502, 1504 relative to the transducer array.

The upper and lower structures 1502, 1504 each comprise pixels having a size that is characteristic of the wavelength of acoustic radiation in the semiconductor substrate. For example, the pixels may be square pixels having sides of length from 200 nm to 5 µm. The pressure reflection coefficient of each pixel is varied randomly and may, for example, be one of two binary values, i.e. essentially reflecting or essentially non-reflecting. Preferably, the reflection coefficient of neighbouring pixels in the random patterns are de-correlated from one another to maximise the information encoded in the first and second scattered acoustic radiation 1508, 1510. Alternatively, the reflection coefficients may be correlated with one another over a characteristic correlation length greater than the size of the pixels.

Although the structures 1502, 1504 in FIG. 15 are two-dimensional random patterns, one-dimensional random patterns can also be used instead. Similarly, it is not required that the scattered acoustic radiation is received by a transducer array 102, 402, 502. It may instead be received by a single receiver transducer 106 (e.g. the same transducer that was used to emit the acoustic radiation 1506) so that the method involves so-called "single pixel imaging" of the upper and lower structures 1502, 1504. Acoustic radiation of from 1 GHz to 10 GHz is generally preferred to achieve high spatial resolution images and therefore to detect small offsets between the upper and lower structures, but other frequencies of acoustic radiation can also be used, e.g. frequencies less than 1 GHz. A metrology target comprising the structures 1502, 1504 may preferably be used with coded excitation pulses of acoustic radiation 216 so that pulse compression techniques can be used to determine the properties of the structures 1502, 1504 accurately.

Figure 16:
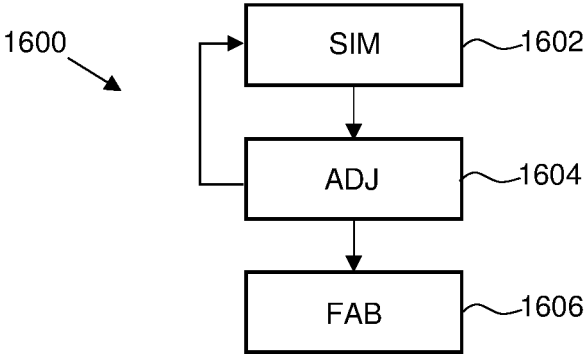
FIG. 16 depicts a flow diagram of a method of designing a metrology target.

FIG. 16 shows a flow chart of the steps of an exemplary method 1600 of designing a metrology target (such as the metrology target described in connection with FIG. 11) for fabrication on or in a semiconductor substrate and for diffracting acoustic radiation emitted by a transducer array. The metrology target comprises a first grating having a first pitch and a second grating having a second pitch, the second grating being spaced apart from the first grating along a direction parallel to a normal of the first and second gratings. The method 1600 comprises one or more iterations of the following steps.

(SIM) 1602: simulating diffraction of acoustic radiation in a frequency range from 1 GHz to 100 GHz from the metrology target. The simulations may be performed, for example, using the K-wave toolbox for MATLAB™).

(ADJ) 1604: adjusting one or more properties of the metrology target comprising at least a pitch of the first and/or second grating such that spatial frequency components of the simulated acoustic radiation diffracted by the first grating span a different range of spatial frequencies from spatial frequency components of the simulated acoustic radiation diffracted the second grating. For example, adjusting the first and/or second pitch may comprise: determining from the simulated diffracted acoustic radiation, a first amplitude of a spatial frequency component of the acoustic radiation diffracted from the first grating and a second amplitude of a corresponding spatial frequency component of the acoustic radiation diffracted from the second grating; and adjusting the first and/or second pitch to increase one of the first and second amplitudes relative to the other. The simulated diffracted acoustic radiation may comprise first acoustic radiation diffracted into a first acoustic diffraction order (e.g. n=+1, −1, +2, −2, etc.) of the first grating and second acoustic radiation diffracted into a first acoustic diffraction order (e.g. n=+1, −1, +2, −2, etc.) of the second grating. The second acoustic radiation may comprise acoustic radiation diffracted into a second acoustic diffraction order of the second grating and the first and/or second pitch may be adjusted such that the spatial frequencies corresponding to first acoustic diffraction order of the first grating are between the spatial frequencies of the first and second acoustic diffraction orders of the second grating. Each of the first and second acoustic radiation may comprise spatial frequency components corresponding to a main lobe and side lobes of the acoustic diffraction order. The first and/or second pitch may be adjusted such that the spatial frequencies corresponding to the main lobe of the first acoustic radiation are between the spatial frequencies of two or more side lobes of the second acoustic radiation. The one or more properties may comprise one or more of: a separation of the first and second gratings; and one or more properties of grating elements of either the first or second grating along a direction of the pitch of the grating to create an apodised grating.

Optionally, the method may comprise an additional step (FAB) 1606 of fabricating a metrology target designed according to the method.

Metrology apparatuses in accordance with embodiments of the present invention may be used where optical scatterometers are not suitable. Alternatively, metrology apparatus in accordance with embodiments of the present invention may be used to complement an optical scatterometer in an inspection or metrology apparatus.

Further embodiments according to the invention are further described in below numbered clauses, which are not claims:

1. A metrology apparatus for determining one or more parameters of a structure fabricated in or on a semiconductor substrate, the apparatus comprising a transducer array comprising a plurality of transducers positioned in a plane, the plurality of transducers comprising at least one transmitter transducer for emitting acoustic radiation in a frequency range from 1 GHz to 100 GHz towards the structure, and at least one receiver transducer for receiving acoustic radiation reflected and/or diffracted from the structure.

2. The metrology apparatus of clause 1, wherein the transducer array is provided in or on a solid delay line element extending from the transducer array in the direction of the structure and having a planar face for positioning adjacent to a corresponding planar face of the substrate or a structure fabricated on the substrate.

3. The metrology apparatus of clause 2, further configured to retain a fluid couplant between the planar faces of the delay line element and the substrate or structure fabricated on the substrate.

4. The metrology apparatus of clause 3, and comprising a substrate support for positioning the substrate adjacent to the delay line element such that the planar faces of the delay line element and the substrate or structure fabricated on the substrate are separated from the delay line element by from 0.10 μm to 5 μm.

5. The metrology apparatus of any one of clauses 2 to 4, wherein the planar face of the delay line element is separated from the transducer array by a distance in a range from 25 μm to 5000 μm.

6. The metrology apparatus of any one of the preceding clauses, wherein the plurality of transducers are arranged along a common axis.

7. The metrology apparatus of any one of the preceding clauses, wherein the plurality of transducers comprises at least one receiver transducer on either side of the at least one transmitter transducer along the common axis.

8. The metrology apparatus of clause 6 or 7, wherein the at least one transmitter transducer comprises a plurality of transmitter transducers connected in parallel and arranged to be excited by a single signal.

9. The metrology apparatus of clause 7, the apparatus wherein the plurality of transmitter transducers is configured to be operated as a phased-array.

10. The metrology apparatus of clause 8 or 9, further comprising one or more switches configured to connect and/or disconnect one or more additional transducers of the plurality of transducers to the at least one transmitter transducer.

11. The metrology apparatus of any one of the preceding clauses, comprising one or more switches configured to switch one or more of the plurality of transducers from being a transmitter transducer to a receiver transducer within a switching time of less than 50 ns, preferably less than 15 ns.

12. The metrology apparatus according to clause 10 or 11, further comprising a controller configured to control the one or more of the plurality of transducers to be a transmitter transducer or a receiver transducer.

13. A metrology apparatus according to any one of the preceding clauses, wherein the one or more transmitter transducers is or are configured to emit the acoustic radiation in a pulse having a duration corresponding to a number of cycles of the acoustic radiation in a range from 1 to 1000 cycles, or preferably from 1 to 15 cycles.

14. The metrology apparatus of any one of the preceding clauses, wherein the transducer array has a pitch in a range from 250 nm to 10 μm.

15. The metrology apparatus of clause 14, wherein each of the plurality of transducers has a length in a direction parallel to the plane in which the transducers are positioned in a range from 10 μm to 100 μm.

16. The metrology apparatus of any one of the preceding clauses, wherein the at least one receiver transducer comprises a plurality of receiver transducers located before and/or after the at least one transmitter transducer along the common axis.

17. The metrology apparatus of clause 16, wherein a pitch between adjacent receiver transducers in the plurality of receiver transducers is smaller than a pitch between adjacent other transducers in the transducer array.

18. The metrology apparatus of any one of the preceding clauses, further comprising a further transducer array comprising a plurality of further transducers coplanar with the transducer array, the plurality of further transducers comprising at least one further transmitter transducer for emitting acoustic radiation in a frequency range from 1 GHz to 100 GHz towards the structure, and at least one further receiver transducer for receiving acoustic radiation reflected and/or diffracted from the structure.

19. The metrology apparatus of clause 18, wherein the further transducer array is oriented at an angle with respect to the transducer array.

20. The metrology apparatus of clause 19, wherein the transducer array and the further transducer array intersect such that one or more transducers are common to both the transducer array and the further transducer array.

21. The metrology apparatus of any one of clauses 1 to 17, wherein the transducer array is a two-dimensional array.

22. The metrology apparatus of clause 21, comprising a substantially central region of the two-dimensional array in which the size and/or pitch of the transducers is larger than the size and/or pitch of the transducers outside of the central region.

23. A method of determining one or more parameters of a structure fabricated in or on a semiconductor substrate, the method comprising:

emitting acoustic radiation in a frequency range from 1 GHz to 100 GHz towards the structure;

receiving, by a transducer array comprising a plurality of transducers, acoustic radiation reflected and/or diffracted from the structure;

obtaining from each of the transducers, signals indicative of the amplitude of the acoustic radiation received by the transducer as a function of time; and using the signals to determine the one or more parameters.

24. A method according to clause 23, wherein acoustic radiation is emitted in a pulse having a duration corresponding to a number of cycles of the acoustic radiation in a range from 1 to 1000 cycles, preferably from 1 to 15 cycles.

25. A method according to clause 23 or 24, wherein using the signals to determine the one or more parameters comprises forming an image of a grating fabricated in or on the semiconductor substrate from which the acoustic radiation was diffracted and/or reflected.

26. A method according to any one of clauses 23 to 25, wherein the one or more parameters comprises a lateral offset of the grating relative to the transducer array.

Further embodiments according to the invention are further described in below numbered clauses, which are not claims:

1. A metrology apparatus for determining one or more parameters of a structure fabricated in or on a semiconductor substrate, the structure comprising a grating, the metrology apparatus comprising: a transducer array comprising a plurality of transducers positioned in a plane, the plurality of transducers comprising:

at least one transmitter transducer configured to emit acoustic radiation in a frequency range from 1 GHz to 100 GHz towards the structure, at least one first receiver transducer configured to receive the acoustic radiation reflected and/or diffracted from the grating into a first acoustic diffraction order; and at least one second receiver transducer configured to receive acoustic radiation reflected and/or diffracted from the grating into a second acoustic diffraction order different from the first acoustic diffraction order.

2. A metrology apparatus according to clause 1, wherein the at least one first receiver transducer and the at least one second receiver transducers are equidistant from a center of the at least one transmitter transducers.

3. A metrology apparatus according to any one of the preceding clauses, wherein the at least one first receiver transducer and the at least one second receiver transducer each comprises a plurality of receiver transducers.

4. A metrology apparatus according to clause 3, wherein for each of the plurality of first receiver transducers there is a corresponding one of the plurality of second receiver transducers that is equidistant from a center of the at least one transmitter transducers.

5. A metrology apparatus according to any one of the preceding clauses, wherein the at least one transmitter transducer is configured to emit the acoustic radiation in a coded excitation pulse.

6. A metrology apparatus according to clause 5, wherein the coded excitation pulse is a chirped pulse.

7. A metrology apparatus according any one of the preceding clauses, further one or more computer processors configured to undertake the steps of:

obtaining from the first and second receiver transducers, respective first and second signals indicative of the amplitude of the acoustic radiation received by the first and second transducers as a function of time;

determining a time difference between the first and second signals; and using the time difference to determine the one or more parameters of the structure.

8. A metrology apparatus according to clause 7, wherein the one or more parameters of the grating is a lateral offset of the grating with respect to the transducer array.

9. A metrology apparatus according clause 7 or 8, wherein determining a time difference comprises one or more of:

determining respective times at which each of the signals first crosses a particular amplitude;

determining a respective one or more times at which each of the signals is zero; and determining a respective one or more times at which a gradient of each of the signals is zero.

10. A metrology apparatus according to any one of the clauses 7 to 9, wherein determining a time difference comprises:

determining a cross correlation function of the signals; and determining the time difference based on a time for which the cross correlation function of the time-varying signals is maximal.

11. A method of determining one or more parameters of a structure fabricated in or on a semiconductor substrate, the structure comprising a grating, the method comprising:

emitting acoustic radiation in a frequency range from 1 GHz to 100 GHz towards the grating;

receiving, using respective first and second transducers, acoustic radiation diffracted from the grating into respective first and second acoustic diffraction orders;

obtaining respective first and second signals indicative of the amplitude of the acoustic radiation received by the first and second transducers as a function of time;

determining a time difference between the signals; and using the time difference to determine the one or more parameters of the structure.

12. A method according to clause 11, wherein the first and second acoustic diffraction orders correspond to respective positive and negative $n^{th}$ acoustic diffraction orders of the grating, wherein n is a positive non-zero integer.

13. A metrology apparatus according to clause 12, where the first acoustic diffraction order corresponds to the +1 acoustic diffraction order of the grating and the second acoustic diffraction order corresponds to the −1 acoustic diffraction order of the grating.

14. A method according to any one of clauses 11 to 13, wherein the first and second transducers are each arranged to receive a maximum amplitude of the acoustic radiation diffracted from the grating into the first or second acoustic diffraction order.

15. A method according to any one of clauses 11 to 14, wherein the grating has a pitch of from 100 nm to 10 μm.

16. A method according to any one of clauses 11 to 15, wherein using the time difference to determine the one or more parameters of the structure comprises determining a lateral offset of the grating relative to the first and second transducers.

17. A method according to any one of clauses 11 to 16, wherein the structure comprises a further grating arranged such that the grating is positioned between the further grating and a source of the acoustic radiation.

18. A method according to clause 16, wherein the grating and the further grating are separated by a distance of 100 nm to 10 μm.

19. A method according to clause 17 or 18, wherein obtaining respective first and second signals indicative of the amplitude of the acoustic radiation received by the first and second transducers as a function of time comprises isolating signals corresponding to acoustic radiation reflected and/or diffracted by the grating from signals corresponding to acoustic radiation reflected and/or diffracted by the further grating.

20. A method according to clause 19 and further comprising using the isolated signals corresponding to acoustic radiation reflected and/or diffracted by the further grating to determine a lateral offset of the further grating relative to the first and second transducers.

21. A method according to any one of clauses 17 to 20, wherein the acoustic radiation reflected and/or diffracted from the further grating arrives at the first and second transducers later than substantially all the acoustic radiation reflected and/or diffracted from the grating.

22. A method according to clause 21, wherein the emitted acoustic radiation is focused onto the grating or the further grating, or between the grating and the further grating.

23. A method according to any one of clauses 16 to 22, further comprising determining a phase difference between respective signals obtained from the first and second transducer and using the phase difference to determine an lateral offset between the grating and the further grating.

24. A method according to any one of clauses 16 to 23, wherein the acoustic radiation is emitted in a coded excitation pulse.

25. A method according to clause 24, wherein the coded excitation pulse is a chirped pulse.

Further embodiments according to the invention are further described in below numbered clauses, which are not claims:

1. A metrology apparatus for determining one or more parameters of a structure fabricated in or on a semiconductor substrate, the structure comprising first and second gratings spaced apart along a direction parallel to a normal of the gratings, the metrology apparatus comprising:

a transducer array comprising a plurality of transducers aligned along a common axis substantially parallel to the first and second gratings, the plurality of transducers comprising one or more transmitter transducers for emitting acoustic radiation in a frequency range from 1 GHz to 100 GHz towards the structure, and one or more receiver transducers for receiving acoustic radiation reflected and/or diffracted from the first and second gratings; and one or more computer processors configured to undertake the steps of:

obtaining from each of the receiver transducers, signals indicative of the amplitude of the acoustic radiation received by the transducer as a function of time;

processing the signals to determine first data indicative of the amplitude of first acoustic radiation reflected and/or diffracted from the first grating as a function of time and second data indicative of the amplitude of second acoustic radiation reflected and/or diffracted from the second grating as a function of time; and using the first and second data to determine one or more parameters of the structure.

2. A metrology apparatus according to clause 1, wherein the one or more transmitter transducers is or are configured to emit the acoustic radiation in a pulse having a duration corresponding to a number of cycles of the acoustic radiation in a range from 1 to 1000 cycles, preferably from 1 to 15 cycles.

3. A metrology apparatus according to clause 1 or 2, wherein the one or more transmitter transducers is or are configured to emit the acoustic radiation in a coded excitation pulse.

4. A metrology apparatus according to clause 3, wherein the coded excitation pulse is a chirped pulse.

5. A metrology apparatus according to any one of the preceding clauses, wherein the one or more transmitter transducers is or are configured to focus the emitted acoustic radiation on to the first grating or the second grating or between the first and second gratings.

6. A metrology apparatus according to clause 1, wherein processing the signals comprises:

determining an amplitude of the received acoustic radiation as a function of time and receiver transducer position along the common axis;

determining a two-dimensional spectrum by performing a Fourier transform of the amplitude of the received acoustic radiation with respect to time and receiver transducer position along the common axis;

applying a mask to the spectrum to suppress or remove one or more features in the spectrum corresponding to one or more acoustic diffraction orders of the second grating;

determining the first data by performing an inverse Fourier transform of the masked spectrum to determine the amplitude of the first acoustic radiation as a function of time and receiver transducer position along the common axis.

7. A method of determining one or more parameters of a structure fabricated in or on a semiconductor substrate, the structure comprising first and second gratings spaced apart along a direction parallel to a normal of the gratings, the method comprising:

emitting acoustic radiation in a frequency range from 1 GHz to 100 GHz towards the structure;

receiving, by a transducer array comprising a plurality of transducers arranged along a common axis, acoustic radiation reflected and/or diffracted from the first and second gratings as a function of time;

processing the signals to determine first data indicative of the amplitude of acoustic radiation reflected and/or diffracted from the first grating as a function of time and second data indicative of the amplitude of acoustic radiation reflected and/or diffracted from the second grating as a function of time; and using the first and second data to determine one or more parameters of the structure.

8. A method according to any one of clause 7, wherein the acoustic radiation is emitted in a coded excitation pulse.

9. A method according to clause 8, wherein the coded excitation pulse is a chirped pulse.

10. A method according to any one of clauses 7 to 9, wherein the first and second gratings are separated by a distance of from 100 nm to 10 μm.

11. A method according to any one of clauses 7 to 10, wherein the first and second gratings each has a pitch of from 100 nm to 10 μm.

12. A method according to any one of clauses 7 to 11, wherein processing the signals comprises:

determining the amplitude of the received acoustic radiation as a function of time and receiver transducer position along the common axis;

determining a two-dimensional spectrum by performing a Fourier transform of the amplitude of the received acoustic radiation with respect to time and receiver transducer position along the common axis;

applying a mask to the spectrum to suppress or remove one or more features in the spectrum corresponding to one or more acoustic diffraction orders of the second grating;

determining the first data by performing an inverse Fourier transform of the masked spectrum to determine the amplitude of the first acoustic radiation as a function of time and receiver transducer position along the common axis.

13. A method according to any one of clauses 7 to 12, wherein the first and second gratings are configured to minimize the overlap between the one or more features in the spectrum corresponding to one or more acoustic diffraction orders of the second grating and features in the spectrum corresponding to one or more acoustic diffraction orders of the first grating.

14. A method according to any one of clauses 7 to 13, wherein the first and/or second grating is or are apodised.

15. A metrology target fabricated on or in a semiconductor substrate and for diffracting acoustic radiation emitted by a transducer array, the metrology target comprising:

a first grating having a first pitch for diffracting the acoustic radiation into first diffracted acoustic radiation comprising a first acoustic diffraction order of the first grating; and a second grating having a second pitch for diffracting the acoustic radiation into a first and second acoustic diffraction order of the second grating, the second grating being spaced apart from the first grating along a direction parallel to a normal of the first and second gratings; and wherein the metrology target is configured such that, for acoustic radiation having a frequency in a range from 1 GHz to 100 GHz and emitted along the direction parallel to the normal of the first and second gratings, a diffraction angle of the first acoustic diffraction order of the first grating is between respective diffraction angles of the first and second acoustic diffraction orders of the second grating.

16. The metrology target of clause 15, wherein the first acoustic diffraction order of the first grating bisects the first and second acoustic diffraction orders of the second grating.

17. The metrology target of clause 15 or 16, for use in a metrology apparatus comprising a fluid couplant between the transducer array and the metrology target, wherein the first and second pitches are tuned based on a thickness of the fluid couplant to reduce and/or minimize acoustic interference between acoustic radiation reflected and/or diffracted by the first grating and acoustic radiation reflected and/or diffracted by the second grating.

18. A metrology target according to any one of clause 15 to 17, wherein the first and second gratings each comprise a plurality of grating elements and the first and/or the second reflection grating is apodised by varying one or more properties of the grating elements along a direction of the pitch of the grating.

19. A metrology target according to clause 18, wherein the one or more properties of the grating elements comprises one or more of: a thickness of the grating elements; a length of the grating elements; and materials from which the grating elements are made.

20. A metrology target according to clause 18 or 19, wherein respective pressure reflection coefficients of the grating elements in the or both apodised grating(s) are configured to reduce the divergence of the diffracted acoustic radiation in one or more acoustic diffraction orders produced by the grating.

21. A metrology target according to any one of clauses 18 to 20, wherein elements in the or both apodised grating(s) are configured to have respective reflection coefficients corresponding to a discretized Bessel function of the first kind.

22. A metrology target according to any one of clauses 15 to 21, wherein the first and second gratings are separated by a distance in a range from 100 nm to 10 μm.

23. A method of designing a metrology target for fabrication on or in a semiconductor substrate and for diffracting acoustic radiation emitted by a transducer array, the metrology target comprising a first grating having a first pitch and a second grating having a second pitch, the second grating being spaced apart from the first grating along a direction parallel to a normal of the first and second gratings, the method comprising one or more iterations of the following steps:

simulating diffraction of acoustic radiation in a frequency range from 1 GHz to 100 GHz from the metrology target; and adjusting one or more properties of the metrology target including at least a pitch of the first and/or second grating such that spatial frequency components of the simulated acoustic radiation diffracted by the first grating span a different range of spatial frequencies from spatial frequency components of the simulated acoustic radiation diffracted the second grating.

24. A method according to clause 23, wherein adjusting the first and/or second pitch comprises:

determining from the simulated diffracted acoustic radiation, a first amplitude of a spatial frequency component of the acoustic radiation diffracted from the first grating and a second amplitude of a corresponding spatial frequency component of the acoustic radiation diffracted from the second grating; and adjusting the first and/or second pitch to increase one of the first and second amplitudes relative to the other.

25. A method according to clause 23 or 24, wherein the simulated diffracted acoustic radiation comprises first acoustic radiation diffracted into a first acoustic diffraction order of the first grating and second acoustic radiation diffracted into a first acoustic diffraction order of the second grating.

26. A method according to clause 25, wherein the second acoustic radiation comprises acoustic radiation diffracted into a second acoustic diffraction order of the second grating and wherein the first and/or second pitch is or are adjusted such that the spatial frequencies corresponding to first acoustic diffraction order of the first grating are between the spatial frequencies of the first and second acoustic diffraction orders of the second grating.

27. A method according to clause 25, wherein each of the first and second acoustic radiation comprises spatial frequency components corresponding to a main lobe and side lobes of the acoustic diffraction order and wherein the first and/or second pitch is or are adjusted such that the spatial frequencies corresponding to the main lobe of the first acoustic radiation are between the spatial frequencies of two or more side lobes of the second acoustic radiation.

28. A method according to any one of clauses 23 to 27, wherein the one or more properties comprises one or more of:

a separation of the first and second gratings; and one or more properties of grating elements of either the first or second grating along a direction of the pitch of the grating to create an apodised grating.

29. A method according to any one of the clauses 23 to 28, further comprising fabricating a metrology target designed according to the method.

The invention claimed is:

1. A metrology apparatus for determining one or more parameters of a structure having a grating fabricated in or on a semiconductor substrate, the apparatus comprising:

a transducer array comprising a plurality of transducers positioned in a plane, wherein the plurality of transducers comprise:

at least one transmitter transducer configured to emit acoustic radiation in a frequency range from 1 GHz to 100 GHz towards the structure, and at least first and second receiver transducers configured to receive acoustic radiation reflected and/or diffracted from the structure, and a processor configured to:

obtain, from the first and second receiver transducers, respective first and second signals indicative of an amplitude of the acoustic radiation received by the first and second transducers as a function of time, determine a time difference between the first and second signals, and use the time difference to determine the one or more parameters of the structure.

2. The metrology apparatus of claim 1, wherein the transducer array is disposed in or on a solid delay line element extending from the transducer array in the direction of the structure and includes a planar face configure to position adjacent to a corresponding planar face of the substrate or a structure fabricated on the substrate.

3. The metrology apparatus of claim 1, wherein the plurality of transducers are arranged along a common axis.

4. The metrology apparatus of claim 1, wherein the plurality of transducers comprises at least one receiver transducer on either side of the at least one transmitter transducer along the common axis.

5. The metrology apparatus of claim 3, wherein the at least one transmitter transducer comprises a plurality of transmitter transducers connected in parallel and arranged to be excited by a single signal.

6. The metrology apparatus of claim 4, the apparatus wherein the plurality of transmitter transducers is configured to be operated as a phased-array.

7. The metrology apparatus of claim 5, further comprising one or more switches configured to connect and/or disconnect one or more additional transducers of the plurality of transducers to the at least one transmitter transducer.

8. The metrology apparatus of claim 1, comprising one or more switches configured to switch one or more of the plurality of transducers from a transmitter transducer to a receiver transducer within a switching time of less than 50 ns.

9. The metrology apparatus of claim 7, further comprising a controller configured to control the one or more of the plurality of transducers to be a transmitter transducer or a receiver transducer.

10. A metrology apparatus of claim 1, wherein the one or more transmitter transducers is or are configured to emit the acoustic radiation in a pulse having a duration corresponding to a number of cycles of the acoustic radiation in a range from 1 to 1000 cycles.

11. The metrology apparatus of claim 1, wherein the transducer array has a pitch in a range from 250 nm to 10 μm.

12. The metrology apparatus of claim 1, further comprising a further transducer array comprising a plurality of further transducers coplanar with the transducer array, the plurality of further transducers comprising at least one further transmitter transducer for emitting acoustic radiation in a frequency range from 1 GHz to 100 GHz towards the structure, and at least one further receiver transducer for receiving acoustic radiation reflected and/or diffracted from the structure.

13. The metrology apparatus of claim 1, wherein the one or more parameters of the grating is a lateral offset of the grating with respect to the transducer array.

14. The metrology apparatus of claim 13, wherein the determining the time difference comprises one or more of:

determining respective times at which each of the signals first crosses a particular amplitude;

determining a respective one or more times at which each of the signals is zero; and determining a respective one or more times at which a gradient of each of the signals is zero.

15. The metrology apparatus according to claim 14, wherein the determining the time difference comprises:

determining a cross correlation function of the signals; and determining the time difference based on a time for which the cross correlation function of the time-varying signals is maximal.

16. The metrology apparatus of claim 1, wherein:

the structure comprises a further grating arranged, such that the grating is positioned between the further grating and the at least one transmitter transducer, the at least first and second receiver transducers are configured to receive acoustic radiation reflected and/or diffracted from the first and second gratings, and the grating has a first pitch and the further grating has a second pitch.

17. The metrology apparatus of claim 1, wherein:

the structure comprises a further grating spaced apart from the grating along a direction parallel to a normal both gratings, and the grating has a first pitch and the further grating has a second pitch.

18. The metrology apparatus of claim 16, wherein the second pitch is different than the first pitch.

19. The metrology apparatus of claim 17, wherein the second pitch is different than the first pitch.

* * * * *